United States Patent
Singhal et al.

(10) Patent No.: US 11,929,838 B1
(45) Date of Patent: Mar. 12, 2024

(54) EGRESS COST OPTIMIZATION FOR MULTI-CLOUD NETWORK

(71) Applicant: VMware, LLC, Palo Alto, CA (US)

(72) Inventors: Madan Singhal, Pune (IN); Amol Manohar Vaikar, Pune (IN); Ambarish Prashant Pande, Akola (IN); Shubhrajyoti Mohapatra, Baripada (IN); Pratiksha Ishwarlal Gugale, Pune (IN); Devraj Narendra Baheti, Akola (IN); Prahalad Gowardhan Deshpande, Dharwad (IN); Abhijit Sharma, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/196,182

(22) Filed: May 11, 2023

(51) Int. Cl.
  *H04L 12/14* (2006.01)
  *H04L 67/10* (2022.01)

(52) U.S. Cl.
  CPC .......... *H04L 12/1421* (2013.01); *H04L 67/10* (2013.01)

(58) Field of Classification Search
  CPC ............................. H04L 12/1421; H04L 67/10
  USPC ....................................................... 709/201
  See application file for complete search history.

(56) References Cited

U.S. PATENT DOCUMENTS

| | | | |
|---|---|---|---|
| 7,035,212 B1 * | 4/2006 | Mittal | H04L 45/60 370/413 |
| 7,502,371 B2 * | 3/2009 | Heiner | H04L 47/762 370/389 |
| 2018/0316620 A1 * | 11/2018 | Llorca | H04L 47/70 |
| 2019/0103993 A1 * | 4/2019 | Cidon | H04L 45/123 |
| 2019/0104111 A1 * | 4/2019 | Cidon | H04L 61/2514 |
| 2019/0158605 A1 * | 5/2019 | Markuze | H04L 69/163 |
| 2021/0067468 A1 * | 3/2021 | Cidon | H04L 12/4633 |
| 2023/0261984 A1 * | 8/2023 | Dunbar | H04L 45/74 370/328 |

\* cited by examiner

*Primary Examiner* — Wing F Chan
*Assistant Examiner* — Leon Y Tseng
(74) *Attorney, Agent, or Firm* — Quarles & Brady LLP

(57) ABSTRACT

Some embodiments provide a method for evaluating locations of applications in a multi-cloud network with applications located in different cloud datacenters of one or more cloud providers. The method receives data for flows collected from the cloud datacenters. The data for each flow indicates a source and destination of the flow and applications to which at least one of the source and destination of the flow belong. The method uses network topology data to identify a subset of the flows as egress flows, each of which is charged by a cloud provider at which the flow source is located. Based on data from the cloud providers, the method determines a cost for each of the egress flows and a cost associated with each of the applications. The method provides these costs to users of the network for the users to optimize locations of the applications in the different cloud datacenters.

25 Claims, 8 Drawing Sheets

Egress Flow Costs

| Source | Source Cloud | Destination | Dest Cloud | Total Traffic (30 Days) | Unit Cost | Cost |
|---|---|---|---|---|---|---|
| Jira App VM1 | AWS Region 1 | Splunk VM4 | On-Prem | 200TB | $2.00/100GB | $4000/month |
| SQL Cluster VM2 | Azure Region 1 | VM5 | On-Prem | 75TB | $2.50/100GB | $1875/month |
| SQL Cluster VM3 | Azure Region 1 | VM5 | On-Prem | 75TB | $2.50/100GB | $1875/month |

*Figure 4*

EGRESS COST OPTIMIZATION FOR MULTI-CLOUD NETWORK

BACKGROUND

As cloud computing grows in popularity, enterprises are often expanding their networks so that they span multiple clouds. This expansion can help to avoid vendor lock-in, increase performance, and provide high availability, among other benefits. A multi-cloud network will often span a combination of public clouds (e.g., AWS clouds, Azure clouds, GCP clouds) and private on-premises datacenters. However, with applications distributed across numerous different clouds, costs can dramatically increase as cloud providers typically charge more for data traffic that leaves their cloud. As such, identifying ways to lower these egress costs becomes important.

BRIEF SUMMARY

Some embodiments provide a method for evaluating the locations of applications in a multi-cloud network (spanning a combination of public and private clouds) in order to better optimize the locations of those applications and reduce costs associated with egress traffic. To perform the evaluation, in some embodiments a network analysis tool uses flow data that is (i) collected from the cloud datacenters in the multi-cloud network and (ii) tagged to indicate the source and destination machines and applications for the flows. By using known network topology (e.g., the locations of different applications and machines), the network analysis tool can identify which of these flows are charged as egress flows by the different cloud providers and then use cost data for the public cloud providers to identify the cost associated with each egress flow and thus each application implemented in the network. The network analysis tool of some embodiments provides the results of this cost analysis to users (e.g., application developers and/or network administrators) so that those users can optimize the locations of the applications or performs its own analysis to provide optimization suggestions.

The multi-cloud network may include applications located in the cloud datacenters of multiple public cloud providers (e.g., AWS, Azure, GCP, etc.) as well as physical on-premises datacenters of an enterprise. These applications are typically distributed applications deployed on multiple data compute nodes (e.g., virtual machines (VMs), containers, etc.) and may need to communicate with each other for various reasons (to retrieve data, send data for analysis provided by another application, etc.). In general, public cloud providers charge based on the amount of data traffic egressing a datacenter or region (which may include multiple datacenters of the same public cloud provider), while internal data traffic is free or minimally charged.

In some embodiments, the network analysis tool (e.g., a network monitoring, verification, and/or analysis application) collects flow data from all of the datacenters spanned by the network. For public cloud datacenters, this flow data may be in the form of flow logs generated by the cloud providers. For the private datacenters, the flow data may be collected as IPFIX and/or NetFlow data in some embodiments. As collected, this flow data typically provides source and destination network addresses for a data flow (assuming unidirectionality, with the opposite direction defined as a separate flow) as well as the amount of data transferred in the flow. In some embodiments, the network analysis tool also uses deep packet inspection (DPI) or integrates with a separate DPI engine to extract higher-layer information (e.g., application-layer information) for each of the data flows.

The network analysis tool uses stored data to map the sources and destinations of flows to (i) data compute nodes (DCNs) and (ii) applications in some embodiments. A network analysis application will store mapping data that maps network addresses to DCN identifiers (e.g., to specific VM identifiers) and either the network addresses or the DCN identifiers to the applications with which they are associated (i.e., the application that is at least partially implemented by a given DCN).

Next, the network analysis tool of some embodiments determines which of the flows counts as an egress flow. Using network topology data that specifies the locations of the different DCNs, each flow can be analyzed to determine whether (i) the source is located in a public cloud datacenter and (ii) the destination is located outside of that public cloud datacenter (or at least outside of the public cloud region to which that public cloud datacenter belongs). Typically, traffic is classified as (and therefore charged as) egress traffic when the traffic is sent from a public cloud datacenter in a first region of a cloud provider to a location external to that cloud provider (whether geographically proximate or not) or to a datacenter in a different region of the same cloud provider.

The network analysis tool then performs cost analysis for the identified egress flows. In some embodiments, the tool receives (e.g., through APIs) costing data from the cloud providers that is used to calculate the cost for each egress flow. The network analysis tool may source this information directly from the cloud providers or via an application that integrates with the cloud providers to retrieve the cost information and provide it to the network analysis tool. The cost data for different cloud providers may specify the cost per amount of data (e.g., $100 for 400 GB) for general egress traffic, or may provide different costs for different types of traffic. For instance, some embodiments charge differently for traffic between regions of the same cloud provider, internet egress traffic (e.g., including traffic to another cloud provider), and VPN traffic to an on-premises datacenter.

The cost for a given flow can thus be calculated by determining the cost per quantum of data (e.g., cost per GB) for that flow and multiplying by the total amount of data transferred via that flow (either overall or over a given time period). With the cost per flow identified, the network analysis tool also computes the cost per application in some embodiments. In some embodiments, the cost for a given application is computed by summing the costs of all of the flows sent to and/or from the machines of that application.

In some embodiments, the network analysis tool generates reports that show the egress costs associated with certain flows, datacenters, and/or applications. For instance, for an application developer, the tool might generate a report indicating the costs for each flow associated with the application, allowing the developer to modify the implementation in order to better optimize costs (e.g., modifying REST API endpoints to reduce traffic). For a network or cloud administrator, the tool could generate a report indicating the costs associated with each application, allowing the administrator to identify the source of excessive costs and possibly move applications from one datacenter to another.

In addition, the network analysis tool performs optimization analysis in some embodiments to provide recommendations to the network administrator as to which applications should be moved in order to optimize costs. In some embodiments, the network analysis tool performs unsupervised machine learning (e.g., spectral clustering) to identify groups of applications that should be co-located in order to optimally reduce costs. In some embodiments, the network analysis tool generates a graph with the applications as nodes and the flows between applications as edges (weighted by amount of data transferred or total cost). The analysis tool uses this graph to identify applications that should be co-located and provide recommendations to the network administrator.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 conceptually illustrates a table of egress flow costs for the multi-cloud network of FIG. 3.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for evaluating the locations of applications in a multi-cloud network (spanning a combination of public and private clouds) in order to better optimize the locations of those applications and reduce costs associated with egress traffic. To perform the evaluation, in some embodiments a network analysis application (or a network analysis tool of a larger application) uses flow data that is (i) collected from the cloud datacenters in the multi-cloud network and (ii) tagged to indicate the source and destination machines and applications for the flows. By using known network topology (e.g., the locations of different applications and machines), the network analysis tool can identify which of these flows are charged as egress flows by the different cloud providers and then use cost data for the public cloud providers to identify the cost associated with each egress flow and thus each application implemented in the network. The network analysis tool of some embodiments provides the results of this cost analysis to users (e.g., application developers and/or network administrators) so that those users can optimize the locations of the applications or performs its own analysis to provide optimization suggestions.

Figure 1:
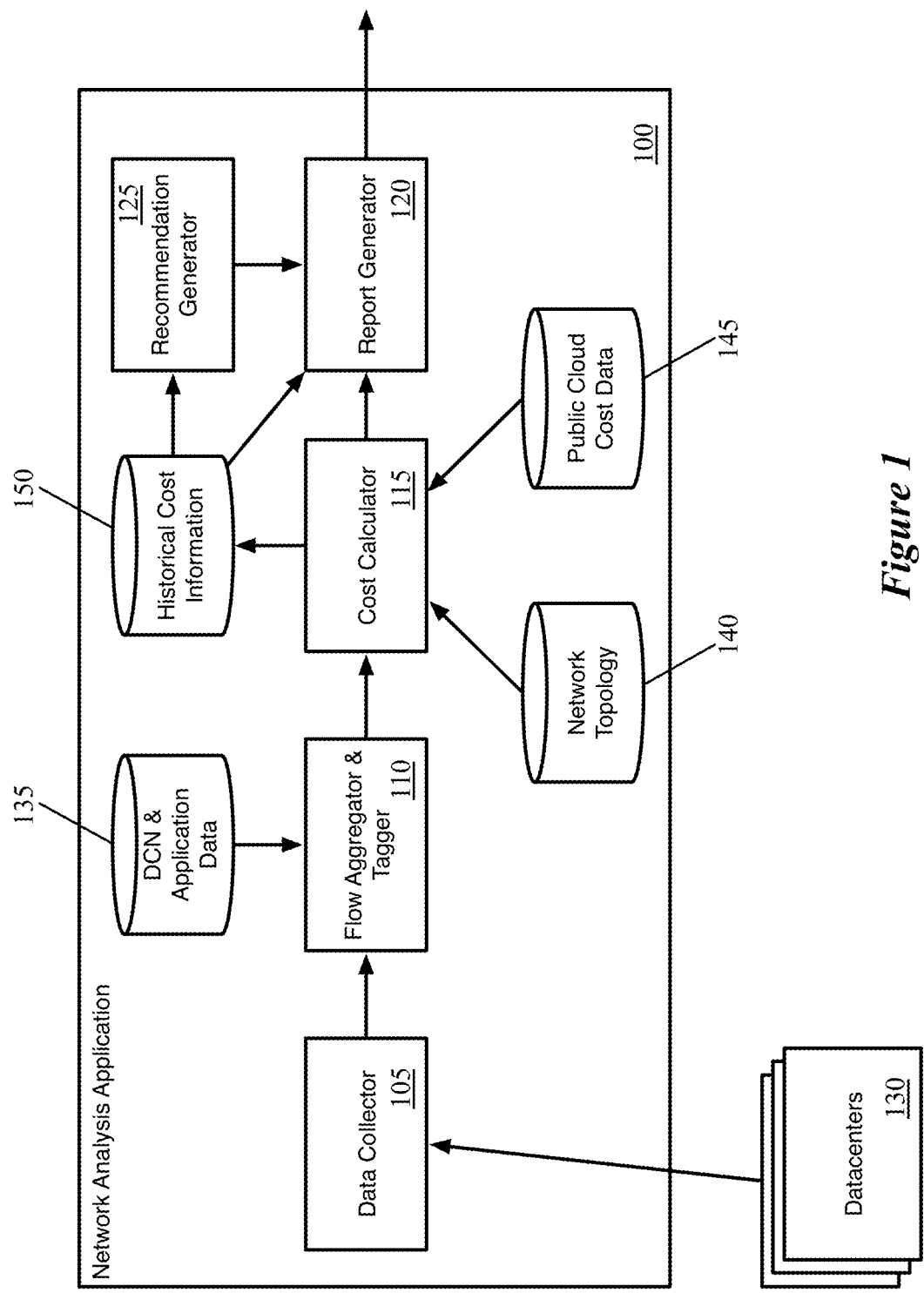
FIG. 1 conceptually illustrates the architecture of a network analysis application of some embodiments.

FIG. 1 conceptually illustrates the architecture of a network analysis application 100 of some embodiments. As shown, the network analysis application 100 includes a data collector 105, a flow aggregator and tagger 110, a cost calculator 115, a report generator 120, and a recommendation generator 125. It should be noted that, while shown as a single application, in some embodiments the operations of the network analysis application 100 are divided into two or more separate applications. For instance, in some embodiments, the data collector 105 and the flow aggregator and tagger 110 are part of a network monitoring and verification application, while the cost calculator 115, the report generator 120, and the recommendation generator 125 are part of a separate application that analyzes egress costs.

The data collector 105 collects flow data from datacenters 130 of the multi-cloud network monitored by the network analysis application 100. In some embodiments, the multi-cloud network includes applications located in the cloud datacenters of one or more public cloud providers (e.g., AWS, Azure, GCP, etc.) as well as physical on-premises datacenters of an enterprise. The data collector 105 collects flow data from all of the datacenters spanned by the network. For public cloud datacenters, this flow data may be in the form of flow logs generated by the cloud providers. For the private datacenters, the flow data may be collected as IPFIX and/or NetFlow data in some embodiments.

As collected by the data collector 105, the flow data typically provides source and destination network addresses for a data flow (assuming unidirectionality, with the opposite direction defined as a separate flow) as well as the amount of data transferred in the flow. In some embodiments, the network analysis tool also uses deep packet inspection (DPI) or integrates with a separate DPI engine to extract higher-layer information (e.g., application-layer information) for each of the data flows.

The flow aggregator and tagger 110 uses data compute node (DCN) and application data 135 stored by the network analysis application 100 to map the sources and destinations of flows to (i) data compute nodes (DCNs) and (ii) machines in some embodiments. The DCN and application data 135 is network information that may be learned from network analysis, from a network management system with which the network analysis application 100 integrates, or via another method. This data 135 includes data that maps network addresses to DCN identifiers (e.g., to specific VM identifiers) and either the network addresses or the DCN identifiers to the applications with which they are associated (i.e., the application that is at least partially implemented by a given DCN). In some embodiments, the flow aggregator and tagger 110 also aggregates flows between the same source and destination. For instance, a VM that is part of a first distributed application might make repeated API calls to another VM that implements a particular service; while these might be different flows (with the same source and destination addresses), they are aggregated together for the purposes of cost analysis.

The flow aggregator and tagger 110 outputs flow data that specifies as many as possible of the source DCN, source application, destination DCN, and destination application. In addition, the flow data identifies the total size (i.e., number of packets and/or total amount of data transferred) of each flow. This size information may be at least partially contained in the flow log data received from the datacenters 130 and partially generated by aggregating data for overlapping flows in some embodiments.

The cost calculator 115 uses network topology data 140 and public cloud cost data 145 to identify egress flow costs for the flows. The network topology data 140 indicates the locations (i.e., the datacenter and region) of the DCNs and applications. This data may also be learned from network analysis, from a network management system with which the network analysis application 100 integrates, or via another method.

The public cloud cost data 145 may be sourced by the network analysis application 100 directly from the cloud providers or via an application that integrates with the cloud providers to retrieve the cost information and provide it to the network analysis tool. The cost data for different cloud providers may specify the cost per amount of data (e.g., $100 for 400 GB) for general egress traffic, or may provide different costs for different types of traffic. For instance, some embodiments charge differently for traffic between regions of the same cloud provider, for internet egress traffic (e.g., including traffic to another cloud provider), and for VPN traffic to an on-premises datacenter.

The cost calculator 115 determines which of the flows count as egress flows (and, if necessary, which types of egress flows) for costing purposes and then performs cost analysis for the identified egress flows. The cost calculator 115 uses the network topology data 140 to identify which flows are egress flows (i.e., based on the location of the source and destination of each flow). Using the cost data 145 as well as the flow size, the cost calculator 115 determines the cost for each of the egress flows. In addition, in some embodiments, the cost calculator 115 calculates the cost for each application by summing the costs of all of the flows sent to and/or from the machines of an application.

The cost calculator 115 provides the computed cost information to the report generator 120 in addition to storing a history 150 of the computed cost data. In some embodiments, the flow collection, flow aggregation and tagging, and cost calculation is performed at regular intervals (e.g., hourly, daily, etc.), with the information for each interval stored in the historical cost information storage 150.

The report generator 120 uses the historical data 150 and/or the output of the cost calculator 115 to generate reports for users of the network. In some embodiments, these reports can indicate the total egress flow cost (and possibly additional information) associated with each application in the network. This information can be used by a network administrator to identify applications generating excessive costs and initiate the movement of applications from one datacenter to another. In addition, the reports can indicate the costs associated with each egress flow of a specific application (potentially with other information about the application flows). These reports can be used by the developer of that application to identify code (e.g., an API call or exposed API endpoint) that is causing these costs and, if possible, edit the code in a way that will reduce the costs.

In some embodiments, the network analysis application 100 also includes a recommendation generator 125. This recommendation generator analyzes the historical egress cost data 150 to generate recommendations as to applications that could be migrated (and to where those applications could be migrated). In some embodiments, the recommendation generator 125 performs unsupervised machine learning (e.g., spectral clustering) to identify groups of applications that should be co-located in order to optimally reduce costs. In some embodiments, the recommendation generator 125 generates a graph with the applications as nodes and the flows between applications as edges (weighted by amount of data transferred or total cost). The analysis tool uses this graph to identify applications that should be co-located and provide recommendations to the network administrator. In some embodiments, the report generator 120 generates recommendation reports using the output of the recommendation generator 125.

Figure 2:
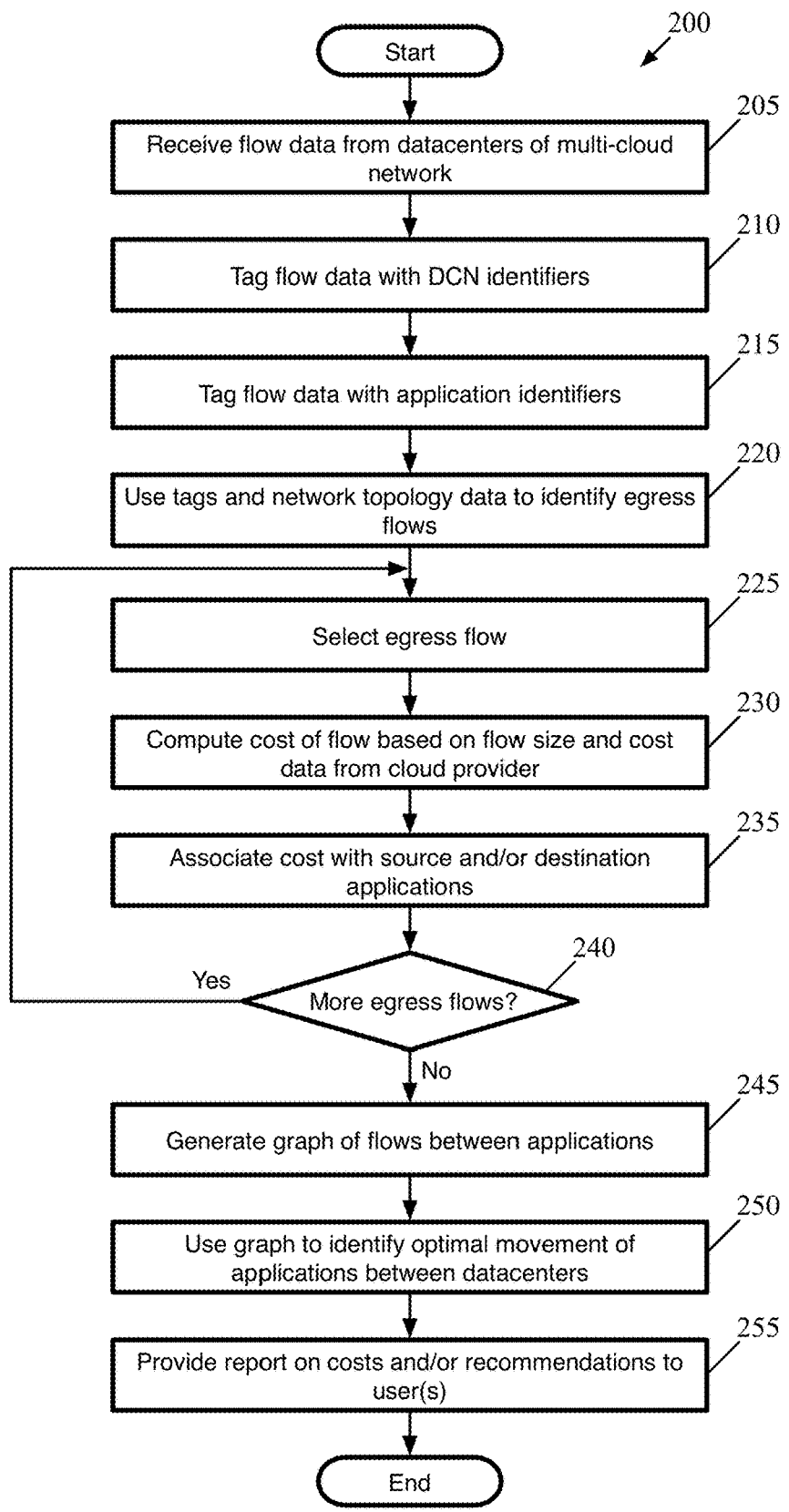
FIG. 2 conceptually illustrates a process of some embodiments for analyzing egress costs in a network and preparing recommendations and/or reports based on this analysis.

FIG. 2 conceptually illustrates a process 200 of some embodiments for analyzing egress costs in a network and preparing recommendations and/or reports based on this analysis. In some embodiments, the process 200 is performed by a network analysis application (e.g., the network analysis application 100). In some embodiments, some of the operations are performed by a network monitoring and analysis application (e.g., the flow data collection and tagging operations) while other operations are performed by a separate egress cost analysis application (e.g., the cost calculations as well as the report and recommendations generation). The process 200 will be described in part by reference to FIGS. 3-7, which illustrate an example of a multi-cloud network as well as cost analysis, example reports, and example recommendation generation.

As shown, the process 200 begins by receiving (at 205) flow data from datacenters of the multi-cloud network. In some embodiments, the network analysis application collects flow data from all of the datacenters spanned by the network. For public cloud datacenters, this flow data may be in the form of flow logs generated by the cloud providers. For the private datacenters, the flow data may be collected as IPFIX and/or NetFlow data in some embodiments. As collected, this flow data typically provides source and destination network addresses for a data flow (assuming unidirectionality, with the opposite direction defined as a separate flow) as well as the amount of data transferred in the flow. In some embodiments, the network analysis application also uses deep packet inspection (DPI) or integrates with a separate DPI engine to extract higher-layer information (e.g., application-layer information) for each of the data flows.

Figure 3:
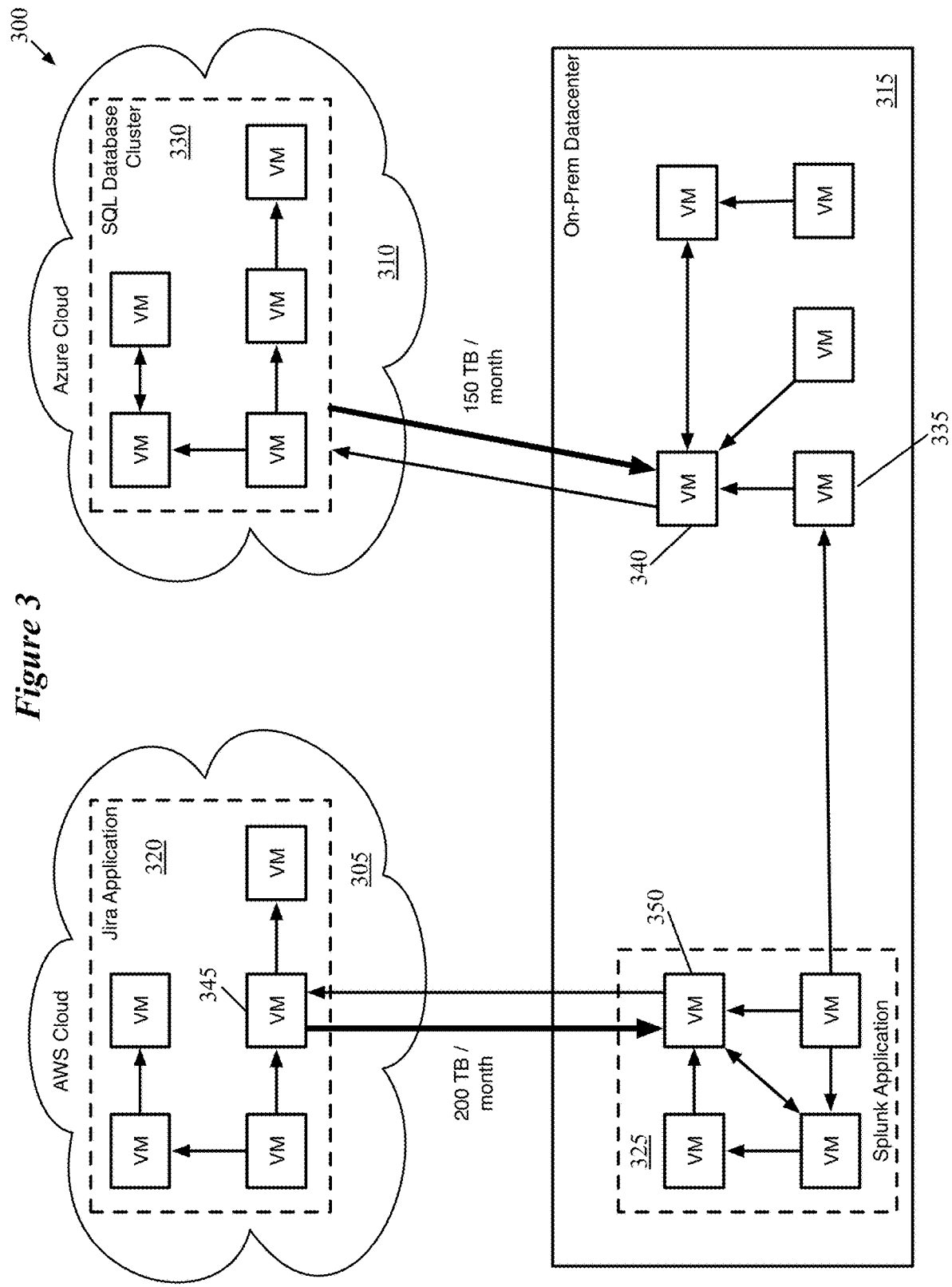
FIG. 3 conceptually illustrates a multi-cloud network of some embodiments.

FIG. 3 conceptually illustrates a multi-cloud network 300 of some embodiments. The multi-cloud network 300 spans three datacenters: an AWS cloud 305, an Azure cloud 310, and an on-premises datacenter 315. In this case, the AWS cloud 305 and the Azure cloud 310 charge egress costs for data traffic that is sent out of their datacenters. In the network 300, a first application (Jira) 320 is implemented across a set of five VMs in the AWS cloud 305, a second application (Splunk) 325 is implemented across a set of four VMs in the on-premises datacenter 315, and an SQL database cluster 330 operates on a set of five VMs in the Azure cloud 310. These applications are implemented as distributed applications on multiple DCNs (in this case as VMs, but the applications could also be implemented as containers (e.g., in a Kubernetes cluster) or other DCNs).

The applications may need to communicate with each other for various reasons, such as to retrieve data, send data for analysis provided by another application, etc. For instance, one of the VMs of the Jira application 320 is in communication with one of the VMs of the Splunk application 325. Furthermore, additional VMs operate in the on-premises datacenter, with a first particular VM 335 in communication with the one of the VMs of the Splunk application 325 and a second particular VM 340 in communication with the SQL cluster 330. A network analysis application (e.g., as shown in FIG. 1) collects flow data from each of these datacenters 305-315, as described above.

Returning to FIG. 2, the process 200 tags (at 210) the flow data with DCN identifiers. The process 200 also tags (at 215) the flow data with application identifiers. In some embodiments, the network analysis application uses stored data to map the sources and destinations of flows to (i) data compute nodes (DCNs) and (ii) machines in some embodiments. A network analysis application will store mapping data that maps network addresses to DCN identifiers (e.g., to specific VM identifiers) and either the network addresses or the DCN identifiers to the applications with which they are associated (i.e., the application that is at least partially implemented by a given DCN).

For instance, in the case of FIG. 3, each of the arrows represents a flow for which the network analysis application collects data. This collected flow data typically specifies at least the source and destination network addresses (e.g., IP addresses). The network analysis application stores data that maps, e.g., each of the IP addresses for the VMs of the Jira application 320 to VM identifiers. Either these VM identifiers or the IP addresses of these VMs are also mapped to the Jira application as well. Similarly, the IP addresses belonging to VMs of the Splunk application 325 and the SQL database cluster 330 are mapped to both VM identifiers and to their respective application groupings. Flows with other VMs that are not part of an application (e.g., VMs 335 and 340) as endpoints are also mapped to these VM identifiers, but not to applications.

Next, the process 200 uses (at 220) the tags as well as network topology data to identify egress flows. Using network topology data that specifies the locations of the different DCNs, each flow can be analyzed to determine whether (i) the source is located in a public cloud datacenter and (ii) the destination is located outside of that public cloud datacenter (or at least outside of the public cloud region to which that public cloud datacenter belongs). Typically, traffic is classified as (and therefore charged as) egress traffic when the traffic is sent from a public cloud datacenter in a first region of a cloud provider to a location external to that cloud provider (whether geographically proximate or not) or to a datacenter in a different region of the same cloud provider.

In the example network 300 shown in FIG. 3, data flows internal to the Jira application 320, the Splunk application 325, or the SQL cluster 330 (i.e., between VMs of the same application) are not classified as egress flows because they do not leave their respective datacenters. In addition, the data flow between the Splunk application 325 and the VM 335 is not an egress flow because it is entirely contained within the on-premises datacenter 315. The traffic sent from a VM 345 of the Jira application 320 to a VM 350 of the Splunk application, however, is an egress flow as this traffic egresses the AWS cloud 305. The return traffic, on the other hand, is not classified as an egress flow. While this traffic egresses the on-premises datacenter 315, there is no cloud provider charge for the traffic (or only minimal charge for ingress to the AWS cloud 305). Similarly, the data sent from the SQL cluster 330 to the VM 340 egresses the Azure cloud 310 and is therefore classified as one or more egress flows, while the return traffic (e.g., requests to the SQL cluster 330) is not.

With the egress flows identified, the process 200 can calculate the costs and perform cost analysis. It should be noted that some embodiments do not discard the non-egress flows, as these flows may be useful for further analysis (especially flows between applications within a datacenter, which could become egress flows if an application were to be migrated). The process 200 selects (at 225) one of the identified egress flows. It should be understood that the process 200 is a conceptual process and that in practice the network analysis application may not select egress flows one at a time for analysis. Instead, in some embodiments the network analysis application performs cost analysis of some or all of the identified egress flows in parallel. In other embodiments, the network analysis searches through the flow data for egress flows and calculates the cost of each identified egress flow as that flow is identified.

The process 200 then computes (at 230) the cost of the selected egress flow based on the flow size (i.e., the amount of data transferred via the flow for a particular length of time) and cost data from the cloud providers. In some embodiments, the network analysis application receives (e.g., through APIs) costing data from the cloud providers that is used to calculate the cost for each egress flow. The network analysis application may source this information directly from the cloud providers or via a separate application that integrates with the cloud providers to retrieve the cost information and provide it to the network analysis tool. In some embodiments, the cost data for a given cloud provider specifies the cost per amount of data sent out of the cloud (e.g., $100 for 400 GB). Some embodiments also differentiate the costs for different types of egress traffic. For instance, some embodiments charge differently for traffic between two regions of the same cloud provider, internet egress traffic (e.g., including traffic to another cloud provider), and VPN traffic to an on-premises datacenter.

The cost for the selected flow can thus be calculated by determining the cost per quantum of data (e.g., cost per GB) for that flow and multiplying by the total amount of data transferred via that flow. Some embodiments perform the flow collection and cost calculation on a regular basis (e.g., hourly, daily, etc.) and compute the cost since the last collection and calculation (e.g., computing the cost of a flow for the last hour or day). The cost over a larger time period can be determined from the historical data (e.g., summing over 24 hours of costs). As described above, a single flow for the purposes of this analysis may actually be multiple aggregated flows between the same source and destination. For instance, a VM that is part of a first distributed application might make repeated API calls to another VM that implements a particular service; while these might be different flows (with the same source and destination addresses), they are aggregated together for the purposes of cost analysis.

With the cost computed for the selected flow, the process 200 associates (at 235) that cost with the source and/or destination applications. In some embodiments, the cost for a given application is computed by summing the costs of all of the flows sent to and/or from the machines of that application. Typically, in performing analysis of the costs, a network administrator will want to know cost on a per-application basis rather than a per-DCN basis, as it will generally make more sense to migrate entire distributed applications between datacenters rather than individual DCNs of an application.

FIG. 4 conceptually illustrates a table of egress flow costs 400 for the multi-cloud network 300. While these costs are shown as monthly, different embodiments may calculate costs over different time periods, as described above. As shown in FIG. 3, there are egress flows of 200 TB/month from the Jira application 320 to the Splunk application 325 and 150 TB/month from the SQL cluster 330 to the VM 340 at the on-premises datacenter 315. The table 400 shows that the 200 TB/month flow is from VM1 of the Jira application in a particular region of the AWS cloud to VM4 of the Splunk application at the on-premises datacenter. The total cost is computed at a rate of $2.00 per 100 GB for a total of $4,000/month. The SQL flows are from two different SQL cluster VMs (e.g., with different IP addresses) in a particular region of the Azure cloud to VM5 in the on-premises datacenter. The cost for each of these flows, at a rate of $2.50 per 100 GB, is approximately $1,875/month (a total of $3750/month).

The process 200 then determines (at 240) whether more egress flows remain for cost calculation. If additional egress flows remain, the process 200 returns to 225 to select the next egress flow. Once all of the egress flows have had costs calculated, the process 200 moves on to perform recommendation and report generation. Though the process 200 includes the recommendation and report generation as a part of a linear process, it should be understood that in some embodiments these operations are performed on demand. That is, some embodiments perform the flow collection and cost calculations at regular intervals but only perform the recommendation and/or report generation when a user requests a report or set of recommendations. Other embodiments generate reports on demand but generate recommendations automatically after a particular amount of time (e.g., after 30 days in order to have enough data built up).

As shown, the process 200 generates (at 245) a graph of flows between applications (and individual machines that are not part of distributed applications) in a network. In some embodiments, the graph includes the applications (and individual machines) as nodes with the flows between these nodes as edges, weighted by amount of data transferred or total cost. In some embodiments, the edges are directed based on the direction of the flow.

Figure 5:
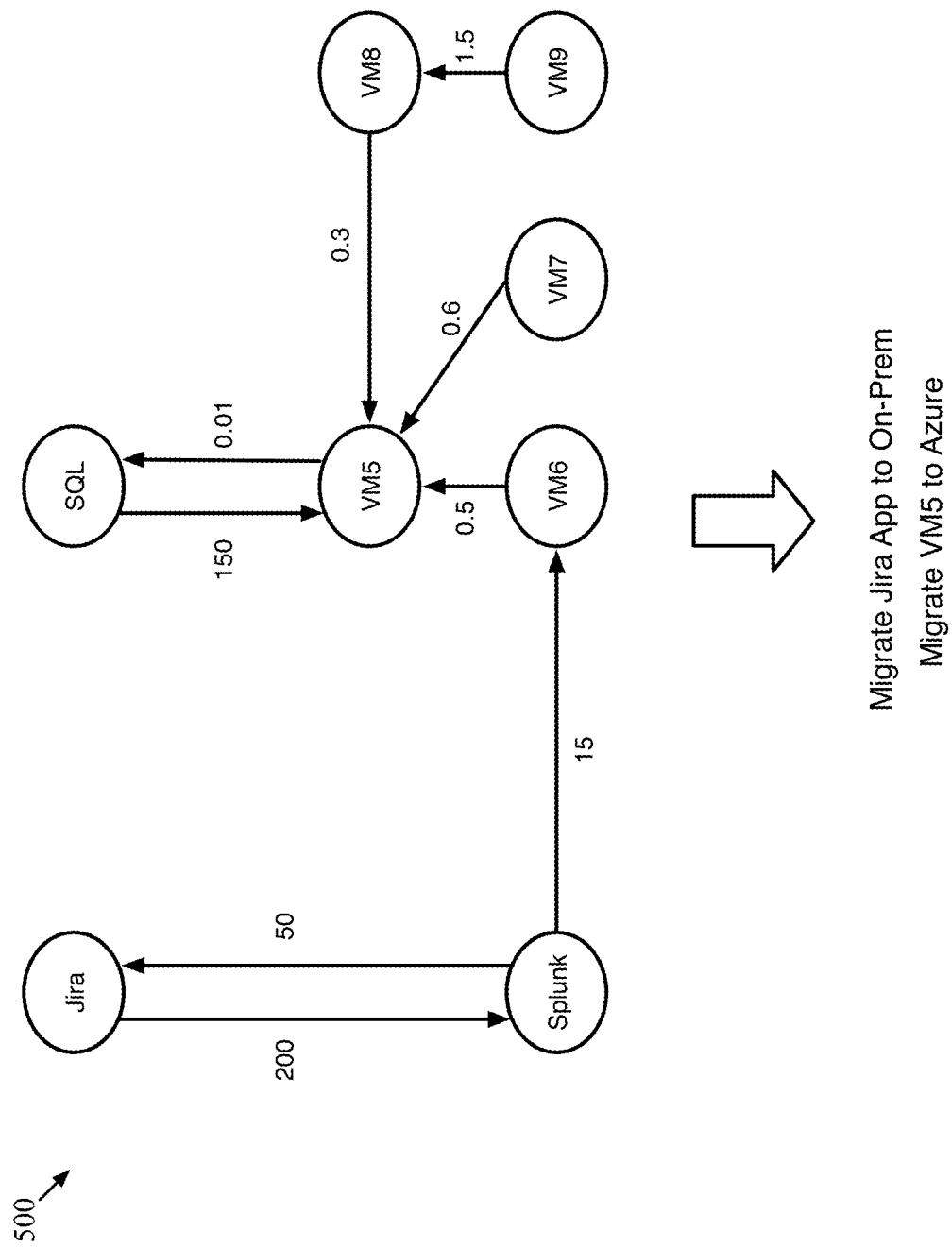
FIG. 5 conceptually illustrates a graph generated for the flows in the network of FIG. 3.

FIG. 5 conceptually illustrates a graph 500 generated for the flows in the network 300. This graph 500 includes single nodes for the applications (i.e., one node for each of the Jira and Splunk applications and the SQL cluster), rather than individual nodes for each of the VMs that makes up these applications. Some embodiments also track internal traffic for each of the applications, while other embodiments do not include this information as the applications are expected to be moved as a group (and thus this internal traffic could not become egress traffic). In addition, the graph 500 includes nodes for each of the individual VMs, including VMs 335 and 340. Each of the edges in the graph is directed, with bidirectional flows shown as two separate flows (as only one of each pair is an egress flow, unless between two nodes in different clouds). In addition, each of the edges has an associated weight. The two egress flows are the largest weights in this case (200 and 150), with many weights (especially those between the individual VMs) being less than 1. In this case, the weights represent the relative amount of traffic transmitted via the flow over a given time period. For instance, the weight of the flow from the SQL cluster to VM5 is 15000 times the weight of the reverse direction flow, presumably because the VM is sending simple requests and receiving large amounts of data from the SQL database cluster.

Returning again to the FIG. 2, the process 200 uses (at 250) the graph to identify optimal movement of applications between datacenters. In some embodiments, this analysis performs spectral clustering using the graph to identify clusters of nodes that should be co-located (e.g., that are connected by the heaviest weighted edges). Other embodiments may perform other types of unsupervised learning (e.g., analyzing the historical cost data) to identify optimal recommendations. In some embodiments, these recommendations account for additional factors beyond just the egress costs, such as the amount of internal traffic an application generates. In certain cases, it may not be optimal to move an application to an on-premises datacenter if the application generates a large amount of internal traffic that would strain the private datacenter and thereby result in other internal costs. If egress charges were the only factor, then ultimately the optimal decision would be to move the entire network back to the private datacenter. In addition, certain cloud platforms are more optimized for certain applications, so other countervailing forces may be present that cut against simply moving the entire network to a single cloud provider.

In the example shown in FIGS. 3 and 5, the recommendations generated based on graph analysis specify that (i) the Jira application 320 should be migrated from the AWS cloud 305 to the private (on-premises) datacenter 315 and (ii) VM5 340 should be migrated from the on-private datacenter 315 to the Azure cloud 310. The first recommendation will co-locate the Jira application 320 with the Splunk application 325, thereby removing the egress traffic charges at the cost of hosting the Jira application 320 internally (this assumes that the Jira application does not have a large amount of internal traffic). Another option could be to move the Splunk application 325 to the AWS cloud 305, depending on the other associated costs of doing so (this might also optimally include moving VM6 335). The second recommendation recognizes that VM5 340 should be co-located with the SQL cluster 330, the SQL cluster 330 should remain in the cloud (so that the burden of hosting this cluster does not fall on the private datacenter), and that the egress costs associated with VM5 340 communicating with other VMs will be significantly lower.

Finally, the process 200 provides (at 255) a report on costs and/or recommendations to a user. As discussed, in some embodiments the output of the network analysis application to a user is dependent on what type of output a user requests (and may be dependent on what type of output a user has permissions to request), rather than being automatically generated as part of a linear process. In some embodiments, an application developer may request flow cost data specific to their application while a network administrator could request general per-application flow cost data, application-specific flow cost data, or application migration recommendations.

Figure 6:
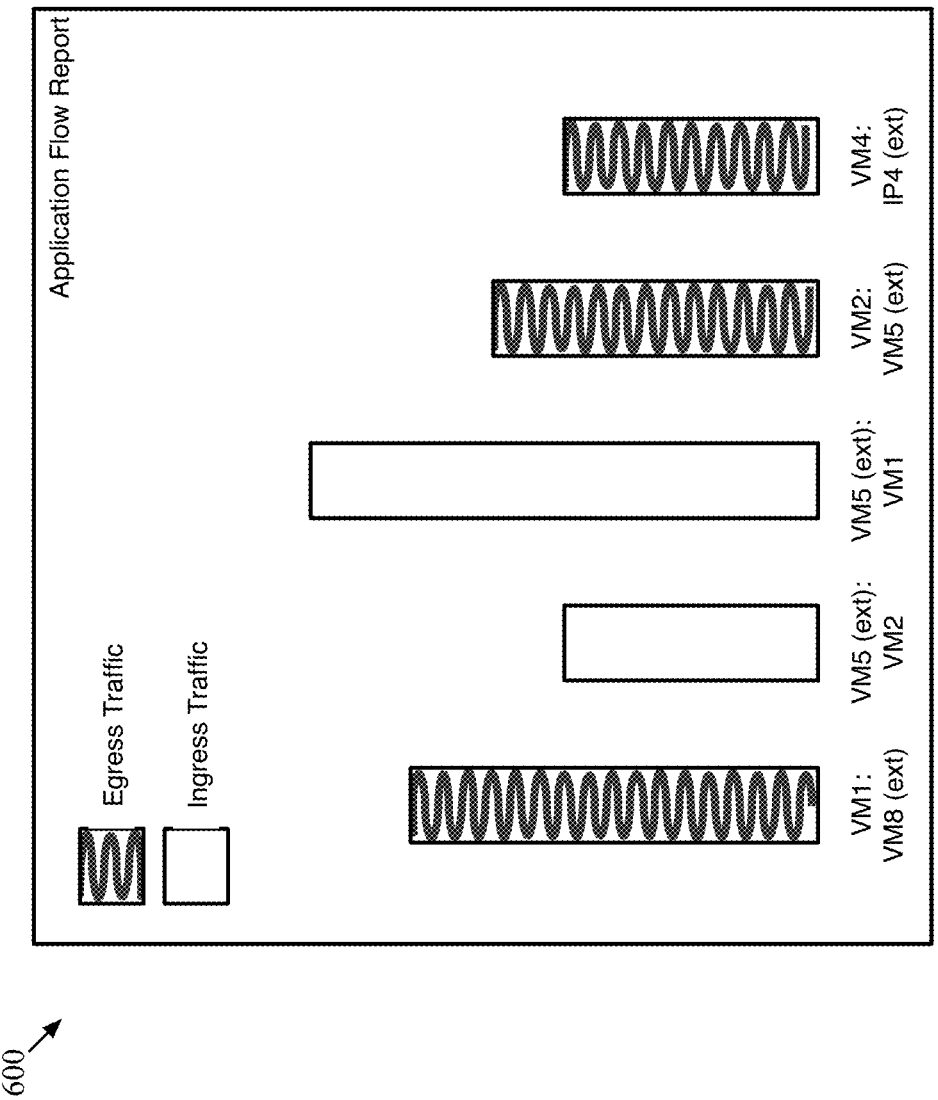
FIG. 6 illustrates a simplified example of an application-specific flow report.

FIG. 6 illustrates a simplified example of an application-specific flow report 600. This report 600 illustrates the relative size of different flows relating to a single application, showing both egress flows and ingress flows. In some embodiments, the determination as to whether a flow is an ingress or egress flow for the purposes of such a report are relative to the application, rather than to a specific cloud datacenter. That is, an egress flow is a flow for which the source is part of the application and the destination is external to the application, while an ingress flow has a source external to the application and a destination that is part of the application. While the report 600 is shown as a bar graph, the information may be provided to in many different forms in different embodiments. For instance, the report could be provided as text rather than as a bar graph, could show only egress flows (or only ingress flows), or provide other information. In addition, the information about each flow could be provided in terms of flow size or cost. While for egress flows the cost should scale with the flow size, ingress flows are charged based on the originating cloud datacenter and therefore might have zero cost (e.g., for flows from an on-premises datacenter or the same cloud as the application).

With this information, an application developer can identify which flows are generating high costs and potentially modify the application code to reduce these costs. For instance, if a particular REST API endpoint is generating very expensive egress flows, this API can be modified so as to provide less total data in response to requests. Similarly, if an API call is being made repeatedly and causing large incoming data transfer, these calls can be reduced or modified if possible. In some embodiments, an application developer can test the application in a production environment (e.g., by running a test suite that simulates average user interactions and interfaces with all of the publicly exposed API endpoints) so as to determine how these costs will scale with full deployment.

Figure 7:
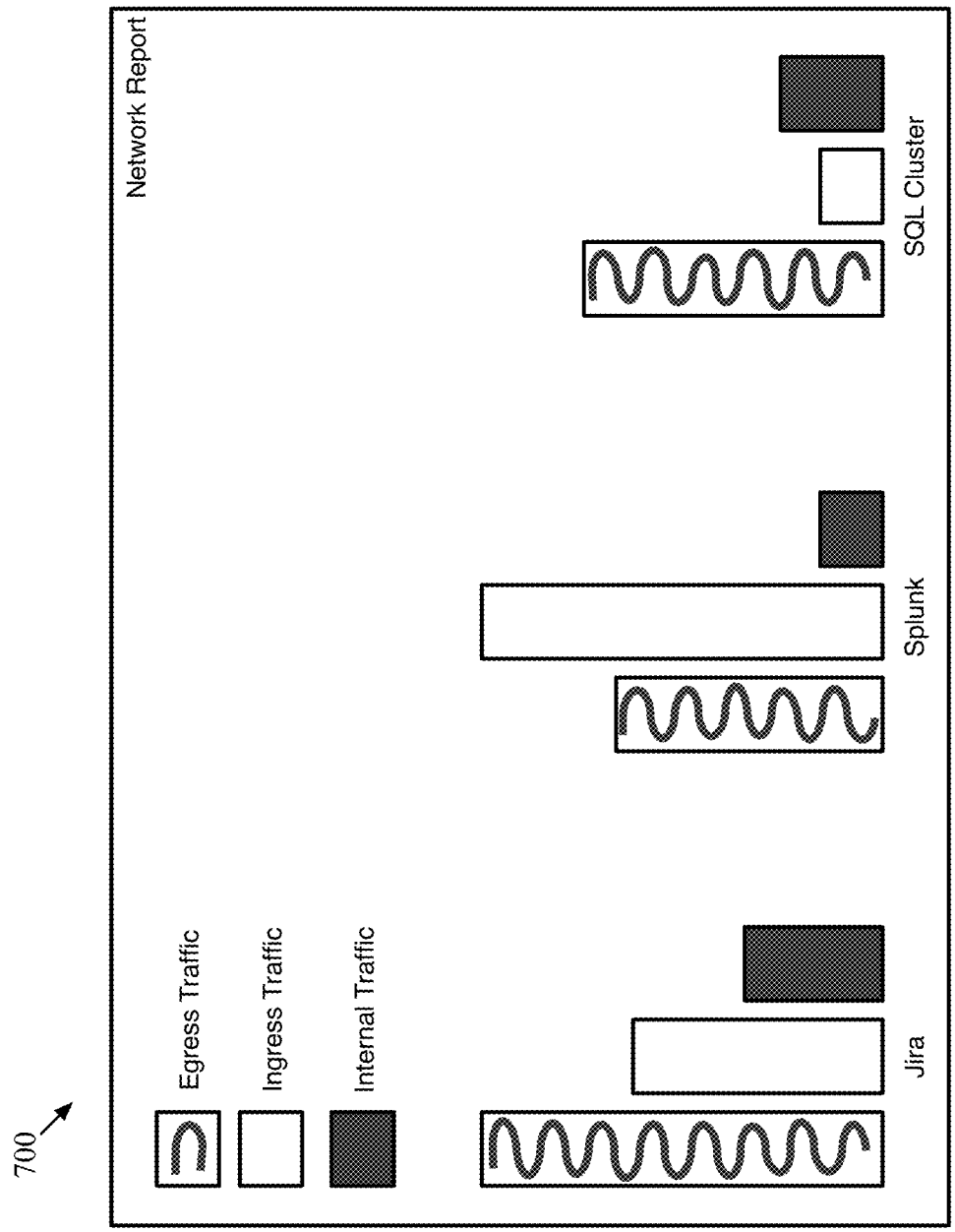
FIG. 7 illustrates a simplified example of a network flow report.

FIG. 7 illustrates a simplified example of a network flow report 700. This report 700 illustrates the relative size of ingress traffic, egress traffic, and internal traffic for the three applications in the network 300. Here, rather than displaying information for individual flows, the ingress, egress, and internal flows of a given application are consolidated. As with the application flow report, ingress and egress are determined relative to the application itself (which is the reason that the bar for the Jira application egress traffic is the same as the bar for the Splunk application ingress traffic). While the report 700 is shown as a bar graph, information about the flows in the network may be provided to in many different forms in different embodiments. For instance, the report could be provided as text rather than as a bar graph, could show only egress flows (or only ingress flows), or provide other information. In addition, the information about each application's traffic could be provided in terms of flow size (with text specifying the total amount of data transferred) or cost (with text specifying the total cost). The report could provide information as to in which datacenter each application is located.

In addition, the ingress and egress traffic for each application could be broken out based on the location of the other side of the flows. For instance, egress traffic could be divided into multiple different amounts for traffic to other clouds (i.e., different amounts for each other cloud), traffic to on-premises datacenters, traffic to external destinations, etc. Ingress traffic could then be divided in the same manner. Some embodiments also provide cost information for different mechanisms in the network report, differentiating between different types of egress traffic (e.g., cross-connects vs. external connections).

With this information, a network administrator can identify the applications that are causing excessive costs and attempt to fix the problem. In some embodiments, a network administrator can setup policies to be notified when egress traffic costs exceed a threshold, then use the reports to identify the root cause of the excessive costs and attempt to rectify the issue (e.g., by moving applications to different datacenters).

Figure 8:
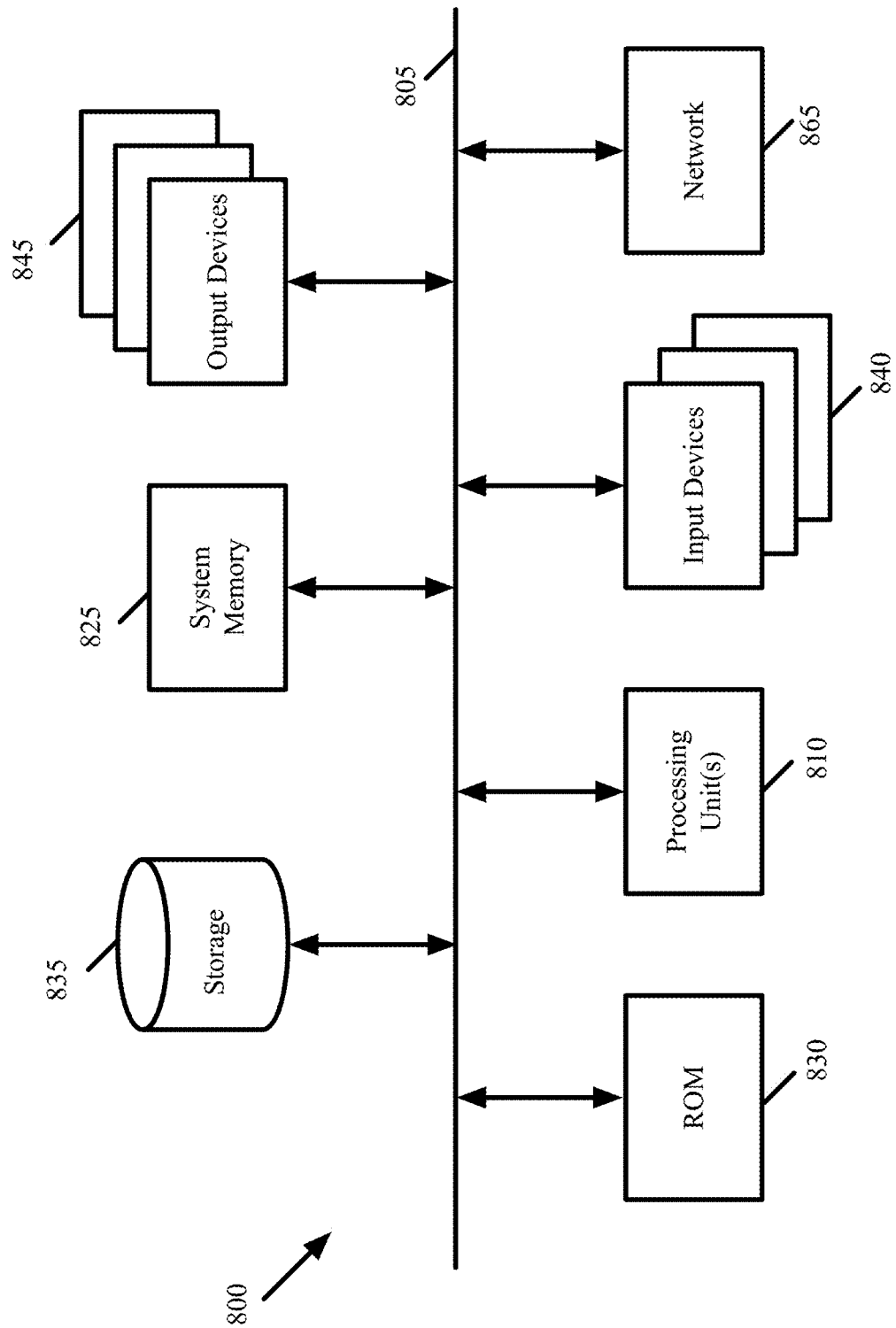
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for evaluating locations of applications in a multi-cloud network that comprises a plurality of applications located in a plurality of different cloud datacenters of one or more cloud providers, the method comprising:
   receiving data for a plurality of flows collected from the plurality of different cloud datacenters, the data for each flow indicating (i) a source and destination of the flow and (ii) applications to which at least one of the source and destination of the flow belong;
   using network topology data to identify a subset of the flows as egress flows, each egress flow charged as an egress flow by a cloud provider at which a source of the flow is located;
   based on cost data from the cloud providers, determining (i) a cost for each of the egress flows and (ii) a cost associated with each of the applications; and
   providing the determined costs to users of the network for the users to optimize locations of the plurality of applications in the different cloud datacenters.

2. The method of claim 1, wherein:
   the multi-cloud network further comprises at least one application located in an on-premises physical datacenter that communicates with applications in one or more of the cloud datacenters; and
   flows from sources in any of the cloud datacenters to destinations in the physical datacenter are identified as egress flows.

3. The method of claim 1, wherein:
   the plurality of cloud datacenters comprises a plurality of datacenters in different regions of a particular cloud provider; and
   flows from sources located in one region of the particular cloud provider to destinations located in different regions of the particular cloud provider are identified as egress flows.

4. The method of claim 1, wherein:
   the plurality of cloud datacenters comprises a plurality of datacenters of different cloud providers; and
   flows from sources located in datacenters of one cloud provider to destinations located in datacenters of different cloud providers are identified as egress flows.

5. The method of claim 1 further comprising:
collecting data for the plurality of flows from the plurality of different cloud datacenters; and
for each flow of at least a subset of the plurality of flows, appending to the collected data machine identifiers and application identifiers for the source and destination of the flow using data that maps network addresses to machine and application identifiers.

6. The method of claim 5, wherein the data is collected from at least a subset of the cloud datacenters as flow logs specifying flows between network addresses.

7. The method of claim 1, wherein:
for each cloud provider, the cost data indicates a cost charged per amount of data egressing a datacenter of the cloud provider; and
determining the cost for a particular egress flow egressing a datacenter of a particular cloud provider comprises multiplying a total amount of data transferred for the particular egress flow by the cost charged per amount of data for the particular cloud provider.

8. The method of claim 7, wherein for each respective egress flow egressing a respective datacenter of a respective cloud provider, determining the cost for the respective egress flow comprising multiplying a total amount of data transferred for the respective egress flow by the cost charged per amount of data for the respective cloud provider.

9. The method of claim 8, wherein determining the cost associated with each of the applications comprises summing the costs calculated for the egress flows sent to and from machines that implement the application.

10. The method of claim 1, wherein the users of the network comprise application developers that use the determined costs to optimize application code to reduce egress traffic associated with the application.

11. The method of claim 1, wherein the users of the network comprise network administrators that use the determined costs to move applications to different datacenters to reduce overall egress traffic in the network.

12. The method of claim 1 further comprising generating recommendations for the users that indicate applications to be moved between datacenter to reduce costs associated with egress flows.

13. The method of claim 12, wherein generating recommendations comprises using unsupervised machine learning to identify optimal moves of applications between datacenters.

14. The method of claim 12, wherein:
generating recommendations comprises generating a graph of inter-application traffic;
nodes of the graph represent applications and edges of the graph represent flows between the applications; and
the edges of the graph are weighted by amounts of data transferred between applications.

15. The method of claim 14, wherein generating recommendations further comprises using the graph to identify optimal moves of applications between datacenters to maximally reduce egress traffic in the network.

16. A non-transitory machine-readable medium storing a program which when executed by at least one processing unit evaluates locations of applications in a multi-cloud network that comprises a plurality of applications located in a plurality of different cloud datacenters of one or more cloud providers, the program comprising sets of instructions for:
receiving data for a plurality of flows collected from the plurality of different cloud datacenters, the data for each flow indicating (i) a source and destination of the flow and (ii) applications to which at least one of the source and destination of the flow belong;
using network topology data to identify a subset of the flows as egress flows, each egress flow charged as an egress flow by a cloud provider at which a source of the flow is located;
based on cost data from the cloud providers, determining (i) a cost for each of the egress flows and (ii) a cost associated with each of the applications; and
providing the determined costs to users of the network for the users to optimize locations of the plurality of applications in the different cloud datacenters.

17. The non-transitory machine-readable medium of claim 16, wherein:
the multi-cloud network further comprises at least one application located in an on-premises physical datacenter that communicates with applications in one or more of the cloud datacenters; and
flows from sources in any of the cloud datacenters to destinations in the physical datacenter are identified as egress flows.

18. The non-transitory machine-readable medium of claim 16, wherein:
the plurality of cloud datacenters comprises a plurality of datacenters in different regions of a particular cloud provider; and
flows from sources located in one region of the particular cloud provider to destinations located in different regions of the particular cloud provider are identified as egress flows.

19. The non-transitory machine-readable medium of claim 16, wherein:
the plurality of cloud datacenters comprises a plurality of datacenters of different cloud providers; and
flows from sources located in datacenters of one cloud provider to destinations located in datacenters of different cloud providers are identified as egress flows.

20. The non-transitory machine-readable medium of claim 16, wherein:
for each cloud provider, the cost data indicates a cost charged per amount of data egressing a datacenter of the cloud provider; and
the set of instructions for determining the cost for a particular egress flow egressing a datacenter of a particular cloud provider comprises a set of instructions for multiplying a total amount of data transferred for the particular egress flow by the cost charged per amount of data for the particular cloud provider.

21. The non-transitory machine-readable medium of claim 20, wherein:
for each respective egress flow egressing a respective datacenter of a respective cloud provider, the set of instructions for determining the cost for the respective egress flow comprises a set of instructions for multiplying a total amount of data transferred for the respective egress flow by the cost charged per amount of data for the respective cloud provider; and
the set of instructions for determining the cost associated with each of the applications comprises a set of instructions for summing the costs calculated for the egress flows sent to and from machines that implement the application.

22. The non-transitory machine-readable medium of claim 16, wherein the users of the network comprise application developers that use the determined costs to optimize application code to reduce egress traffic associated with the application.

23. The non-transitory machine-readable medium of claim 16, wherein the users of the network comprise network administrators that use the determined costs to move applications to different datacenters to reduce overall egress traffic in the network.

24. The non-transitory machine-readable medium of claim 16, wherein the program further comprises a set of instructions for generating recommendations for the users that indicate applications to be moved between datacenter to reduce costs associated with egress flows.

25. The non-transitory machine-readable medium of claim 24, wherein the set of instructions for generating recommendations comprises sets of instructions for:

generating a graph of inter-application traffic, wherein nodes of the graph represent applications and edges of the graph represent flows between the applications, wherein the edges of the graph are weighted by amounts of data transferred between applications; and using the graph to identify optimal moves of applications between datacenters to maximally reduce egress traffic in the network.

\* \* \* \* \*